July 20, 1937.   G. A. SEELEY   2,087,335
STRAND MEASURING APPARATUS
Filed June 30, 1934
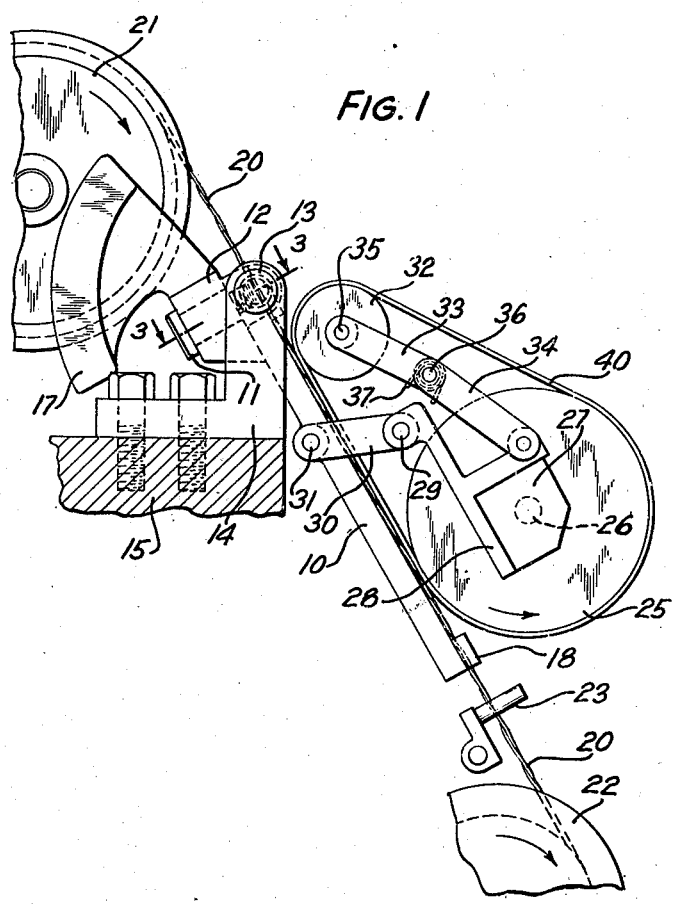
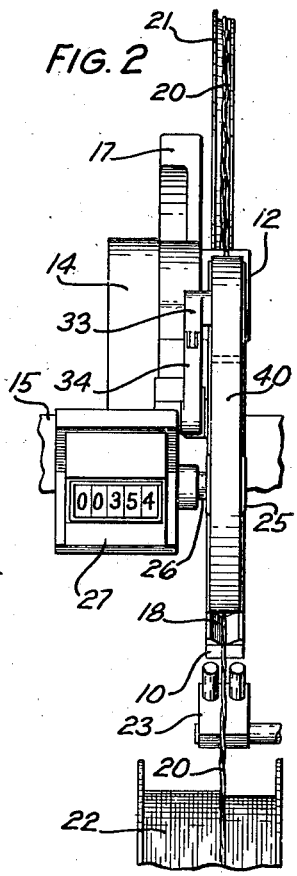
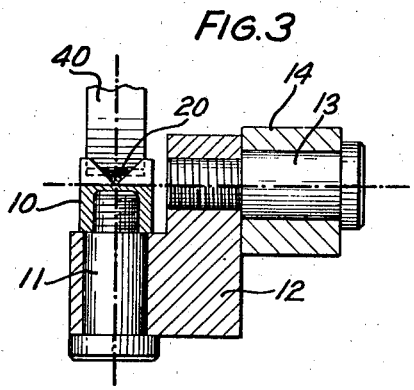
INVENTOR
G. A. SEELEY
BY H. A. Whitehorn
ATTORNEY Patented July 20, 1937

2,087,335

UNITED STATES PATENT OFFICE 2,087,335

STRAND MEASURING APPARATUS

George A. Seeley, Baltimore, Md., assignor to Western Electric Company, Incorporated, New York, N. Y., a corporation of New York Application June 30, 1934, Serial No. 733,173

10 Claims. (Cl. 33—134)

This invention relates to a strand measuring apparatus, and more particularly to an apparatus for measuring unevenly surfaced material.

An object of the invention is to provide a simple, efficient and practical apparatus which will accurately measure unevenly surfaced material.

In accordance with the object one embodiment of the invention contemplates a material guide for receiving material from a processing machine as it is advanced to a takeup reel, the material guide being movably mounted upon a fixed support at the entrance point of the guide, a measuring wheel and idler wheel supported by the guide, a belt disposed upon the wheels, tensioning means for urging the wheels toward the guide and for holding the belt in close engagement with material so that the wheels will be rotated by the advancement of the material, and a measuring means controlled by the measuring wheel which preferably stops the processing machine when a predetermined length of material has been advanced.

Other objects and advantages will be apparent from the following detailed description taken in conjunction with the accompanying drawing, wherein Fig. 1 is a side elevational view of the apparatus;

Fig. 2 is a front elevational view of the apparatus, and

Fig. 3 is a sectional view taken along the line 3—3 of Fig. 1.

Referring now to the drawing wherein like reference numerals designate similar parts throughout the views, numeral 10 designates a material guide secured at its upper end to a pivot pin 11 so that the guide may be moved through an arc about the axis of a pivot pin. The pivot pin 11 is carried by a bracket 12 to which is fixed a pivot pin 13, the latter being positioned at right angles to the center line of the pivot pin 11. The pivot pin 13 is journaled in a horizontal bearing 14, which is mounted upon a fixed support 15 and permits the guide 10 to be moved through an arc about its axis. The guide 10 may therefore be swung in any direction about its upper end, but since the axes of the pivot pins 11 and 13, if extended, would intersect each other at the entrance point of the guide 10, the material prior to entering the guide will not be disturbed during the universal movement of the guide. A weight 17 is carried by the bracket 12 and serves as a counterbalance for the guide 10 and the elements carried by the guide which will hereinafter be described.

At each end of the guide 10 transversely extending walls are formed to provide V-shaped grooves 18 to hold the material upon the guide and to cause the guide to move with the material. The material indicated generally at 20 is received from a capstan 21 of a processing machine and passed over the guide 10 to a takeup reel 22 upon which it is distributed by any suitable distributing mechanism indicated at 23. In the present instance, the material being measured is twisted wire which of course has an uneven or irregular surface.

A measuring wheel 25 is mounted upon a shaft 26 of a counter 27 so that the counter will be actuated during the rotation of the measuring wheel. The counter 27 is mounted upon an arm 28 which is connected at 29 to one end of a link 30, the other end of the link being pivotally connected at 31 to the guide 10. An idler wheel 32 positioned a short distance from the measuring wheel 25, is supported by toggle links 33 and 34 which connect a shaft 35 for the idler wheel to the arm 28. The links 33 and 34 are pivotally connected at their adjacent ends as indicated at 36 and are normally urged toward aligned positions by a spring 37. An endless belt 40 is disposed around the measuring wheel 25 and the idler wheel 32 as illustrated in Fig. 1 and the purpose of the spring 37 is to hold the belt taut upon the wheels. In the embodiment of the invention shown the weight of the measuring apparatus is sufficient to hold the belt 40 in operative engagement with the wire being measured, although if desired additional tension means can be used.

The counter 27 may be operatively connected in any suitable manner (not shown) to the processing machine including the capstan 21 so as to stop the actuation thereof when a predetermined length of wire has passed through the counter mechanism, or may be utilized in any desired or usual way to indicate the measurement.

In preparing the apparatus for operation, the wire 20 is fed through the measuring unit, that is, over the guide 10 and beneath the belt 40, through the distributing unit 23 to the reel 22 where the forward end of the wire is fastened. As will be observed by viewing Fig. 2 the entrance point of the guide 10 is in general alignment with the small diameter of the capstan 21, i. e. the side from which the wire is taken off, and regardless of the movement of the guide the entrance point thereof will not be shifted.

When the capstan 21 and the reel 22 are rotated, the wire will be advanced over the guide 10 and beneath the belt 40 causing the belt to move with the wire and causing a rotation of the wheels so that the counter 27 will be actuated. The peripheral surfaces of the wheels 25 and 32 are flat causing the flat belt 40 to move parallel with the general center line of the wire, at the same rate of speed as the wire and not follow the general contour of the wire. In this manner measuring wheel 25, which is rotated by the belt will accurately measure the length of the twisted wire which would not be possible, of course, if the measuring wheel followed the general longitudinal contour of the wire. During the advancement of the wire it is constantly moved by the distributor 23 to evenly distribute the wire upon the takeup reel and with the pivotal supports 11 and 13 of the guide 10 the measuring unit will readily follow the wire, the pivot 11 permitting lateral movement of the guide during the back and forth movement of the distributor, and the pivot 13 permitting vertical movement of the guide at the completion of each layer of wire upon the takeup reel. This movement of the measuring unit is aided by the weight 17 which counterbalances the mechanism upon the opposite side of the pivots 11 and 13 so as to permit movement of the measuring unit readily.

Although only one specific embodiment of the invention has been shown and described therein, it should be understood that the device is capable of other modifications and adaptations without departing from the spirit and scope of the appended claims.

What is claimed is:

1. In an apparatus for measuring twisted wire, a grooved capstan over which the wire is passed, a takeup reel for receiving the twisted wire, means for distributing the wire upon the takeup reel, a measuring unit positioned between said capstan and said takeup reel and through which the wire passes for measuring the length of the wire, and means for hingedly supporting the measuring unit at the entrance end thereof so that the entrance end will be positioned in general alignment with the groove of the capstan during the movement of the measuring unit while following the material as it is distributed upon said takeup reel.

2. In an apparatus for measuring irregularly surfaced material, means for advancing the material, a hinged guide mounted against longitudinal movement with the material over which the material may pass, said guide being movable about its hinge by transverse movements of the material, a measuring unit carried by said guide, said unit including a wheel, a spaced idler wheel, an endless belt passing around said wheels and held for a portion of its length in engagement with the material passing over said guide so that said wheels will be rotated by the advancement of the material and means actuated by the rotation of said measuring wheel for measuring the length of the material.

3. In an apparatus for measuring strand material, a guide mounted for movement in a plurality of directions and arranged to constantly engage advancing material, means for advancing and taking up the material including a take-up device of substantial width, means for moving the material to distribute it laterally upon the takeup means, said guide movable by the material during its distribution and at right angles thereto at the completion of each layer of material upon the takeup means, and a measuring unit movable with said guide including means frictionally engaging the advancing material and actuated thereby for measuring the length thereof.

4. In an apparatus for measuring strand material, a pivotal counterbalanced guide constantly engaging one side of advancing material, means for advancing and taking up the material including a take-up device of substantial width, means for distributing the material upon the takeup means, said pivotal guide movable by the material during its distribution, a measuring unit pivotally mounted upon the guide and movable therewith, said unit including an element frictionally engaging the side of the advancing material which is opposite said guide and movable thereby at the same rate of speed as the material for measuring the length thereof.

5. In an apparatus for measuring strand material, a guide mounted for movement in a plurality of angular directions and counterbalanced to engage at all times one side of the advancing material, means for advancing and taking up the material including a take-up device of substantial width, means for distributing the material laterally upon the takeup means, said guide movable by the material during its distribution and at an angle thereto as it follows the material at the completion of each layer of material upon the takeup means, and means carried by the guide including an element frictionally engaging the opposite side of the advancing material and actuated thereby for measuring the length thereof.

6. In an apparatus for measuring irregularly surfaced material, means for supplying and advancing material, a takeup means upon which the advancing material is wound, means for distributing the material laterally upon the takeup means, a movable guide between said material supply and takeup means constantly engaged by the advancing material, said guide mounted for movement in one direction by the material during its distribution and at an angle thereto at the completion of each layer of material upon the takeup means, and a measuring unit movable with said guide including an endless movable member frictionally engaging the advancing material and actuated thereby for measuring the length thereof.

7. In an apparatus for measuring strand material, a takeup reel, a surface over which the material passes to said reel, a pivotal support for said surface, an endless movable member gravitationally urged toward said surface to engage the material thereon and cause said surface to pivot as the material on the reel builds up, and a measuring device actuated responsive to the movement of said endless member.

8. In an apparatus for measuring strand material, a takeup reel, a surface over which the material passes to said reel, a universal pivotal support for said surface, an endless movable member gravitationally urged toward said surface to engage the material thereon and cause said surface to pivot as the material on the reel builds up, a measuring device actuated responsive to the movement of said endless member, means for distributing the material on said reel, and means for causing said surface to pivot in response to the distribution of the material on the reel.

9. In an apparatus for measuring strand material, a hinged guide for the material and a measuring device carried thereby, said measuring device comprising a pair of pulleys, an endless movable member mounted on said pulleys and engaging the material to be measured, interconnected toggle links for holding the pulleys apart to tighten the endless member, and means tending to straighten the links.

10. In an apparatus for measuring strand material, a guide mounted for universal movement over which the material is advanced, means for advancing and taking up the material including a take-up device of substantial width, means for moving the material to distribute it laterally upon the take-up means, the said movement of the guide being solely responsive to the movement of the material during its distribution, and a measuring unit pivotally connected to and universally movable with said guide, said unit including means frictionally engaging the advancing material and actuated thereby for measuring the length thereof.

GEORGE A. SEELEY.